United States Patent
Yorkey et al.

(10) Patent No.: US 6,317,218 B1
(45) Date of Patent: Nov. 13, 2001

(54) PRINTER WITH ADAPTIVE PRINTING MODE

(75) Inventors: Timothy Gerard Yorkey; Allen Patrick Johnson; David William Murphy, all of Lexington, KY (US); Christy Mitchell West, Hendersonville, TN (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/500,402

(22) Filed: Feb. 8, 2000

(51) Int. Cl.[7] .................................................. G06F 15/00
(52) U.S. Cl. ......................... 358/1.13; 347/115; 399/124
(58) Field of Search .............................. 358/1.1, 1.6, 1.9, 358/1.12, 1.13, 1.14, 1.15; 347/43, 112, 115, 116, 117, 118, 129, 232; 399/124, 381, 388, 391, 397, 16, 23, 28, 76, 85

(56) References Cited

U.S. PATENT DOCUMENTS

| | | |
|---|---|---|
| 4,586,834 * | 5/1986 | Hachisuga et al. ............. 400/120.13 |
| 4,652,115 | 3/1987 | Palm et al. . |
| 4,833,491 * | 5/1989 | Rezanka .................................. 347/43 |
| 4,841,335 | 6/1989 | Kohyama . |
| 4,864,328 | 9/1989 | Fischbeck . |
| 4,998,145 | 3/1991 | Haneda et al. . |
| 5,023,662 | 6/1991 | Kusumoto et al. . |
| 5,028,992 | 7/1991 | Arai . |
| 5,070,367 | 12/1991 | Sugano et al. . |
| 5,153,651 | 10/1992 | Kurotaka . |
| 5,202,727 | 4/1993 | Izumizaki et al. . |
| 5,307,135 | 4/1994 | Amakawa et al. . |
| 5,436,647 | 7/1995 | Kasahara . |
| 5,537,199 | 7/1996 | Takai et al. . |
| 5,622,364 | 4/1997 | Dutton et al. . |
| 5,688,059 | 11/1997 | Clarke et al. . |
| 5,701,549 | 12/1997 | Portig et al. . |
| 5,845,174 | 12/1998 | Yasui et al. . |
| 6,108,017 * | 8/2000 | Katakura et al. ..................... 347/115 |
| 6,201,946 * | 3/2001 | Takeuchi et al. .................... 399/381 |
| 6,204,867 * | 3/2001 | Fujimoto et al. ..................... 347/118 |

* cited by examiner

*Primary Examiner*—Garcia Gabriel
(74) *Attorney, Agent, or Firm*—John A. Brady

(57) ABSTRACT

A printer has monochrome and color printing heads for printing color and monochrome images, respectively, and a media feed path for moving sheets of media by the printing heads. The media feed path has a color position in which the color printing heads print color images and the monochrome printing head prints monochrome images, and a monochrome position in which the monochrome printing head prints monochrome images but the color printing heads cannot print color images. A memory stores data on prior print jobs, and a control circuit switches the media feed path from the color position to the monochrome position in response to the data stored in the memory.

16 Claims, 7 Drawing Sheets

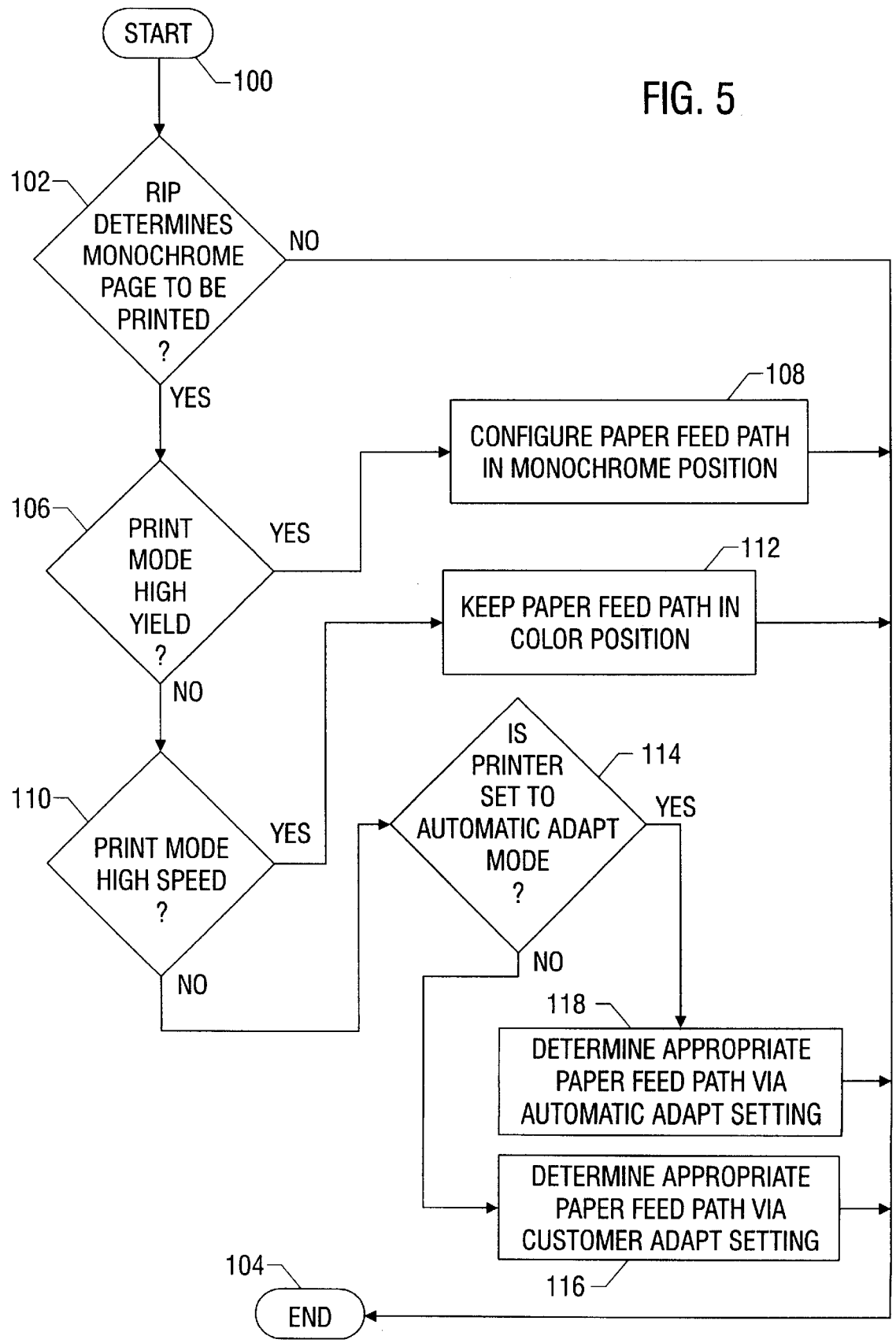

PRINTER WITH ADAPTIVE PRINTING MODE

FIELD OF THE INVENTION

This invention relates to the printing modes of a printer, and more particularly, to a method and apparatus for adaptively selecting the printing mode of a printer using historical data from prior printing jobs.

BACKGROUND OF THE INVENTION

A color electrophotographic printer can print both color and monochrome (commonly referred to as "black and white") images on sheets of paper or other media The printer has color and monochrome heads positioned adjacent each other, and uses the color heads to print the color sheets and the monochrome head to print the monochrome sheets. The paper feed path of the printer has two positions in which images may be printed on sheets of media with the color and monochrome heads: a color position, in which sheets feed past both the color and monochrome heads and can print both color and monochrome images, and a second, monochrome position, in which the sheets feed past only the monochrome head and can print only monochrome images. The printer can operate in a high speed mode, with a high printing speed, or in a high yield mode, with a slower printing speed but longer supply use.

While the high speed mode of the printer has the highest printing speed, certain sacrifices must be made in order to obtain such speed. In particular, the paper feed path must remain in the color position, in which the sheets feed past both the color and the monochrome printing heads. However, the color printing heads receive unnecessary wear in this position when only monochrome sheets are printed, as they are not used, but nevertheless contact the sheets that are printed. The color printing heads wear out and fail much more frequently than would otherwise occur if only the monochrome printing head was in contact with the sheets printed in monochrome, and must consequently be replaced at considerable expense and inconvenience.

From a wear and reliability standpoint, it is preferable to utilize the high yield mode. The paper feed path changes between the two positions, so that the color printing heads only contact the sheets when a color image is printed, but not when a monochrome image is printed, thus minimizing wear. However, as noted, this mode results in relatively slow printing speeds, as considerable time is required for the position of the paper feed path to change back and forth.

It would thus be advantageous to increase the printing speed of the printer by printing some monochrome images with the paper feed path in the color position, where it prints both color and monochrome images, without changing the paper feed path to the monochrome position and slowing down the printing speed, but not such a large number that would result in excessive wear to the color printing heads.

SUMMARY OF THE INVENTION

A printer in accord with the present invention overcomes the foregoing problems by storing data on prior print jobs in a memory, and then adaptively switching the media feed path from the color printing position, in which the printer can print both color and monochrome sheets, to the monochrome printing position, in which the printer can print only monochrome sheets, in response to the data stored in the memory. The data stored may be information such as the identity of prior users, the applications utilizing the printer, the printer ports from which the print jobs come, the number of sheets printed in color, and the length of prior print jobs. Alternatively, a user can select a desired maximum number of monochrome sheets to be printed before the printer switches the media feed path to the monochrome position. A computer program stored in memory may most advantageously control the aforementioned operations.

An object of this invention is to provide a method and apparatus for printing both monochrome and color images on sheets of media that have minimal wear on the components.

Another object of this invention is to provide a method and apparatus for printing both monochrome and color images on sheets of media that have low maintenance costs.

A further object of this invention is to provide a method and apparatus for printing both monochrome and color images on sheets of media that are reliable.

A still further object of this invention is to provide a method and apparatus for printing both monochrome and color images on sheets of media that optimizes the performance of the printer while minimizing wear on components.

Other objects of this invention will be readily perceived from the following description, claims, and drawings.

BRIEF DESCRIPTION OF THE DRAWINGS

The attached drawings illustrate preferred embodiments of the invention, in which:

FIG. 5 is a flowchart for software that implements an adaptive mode of the printer;

DETAILED DESCRIPTION OF PREFERRED EMBODIMENTS

Figure 1:
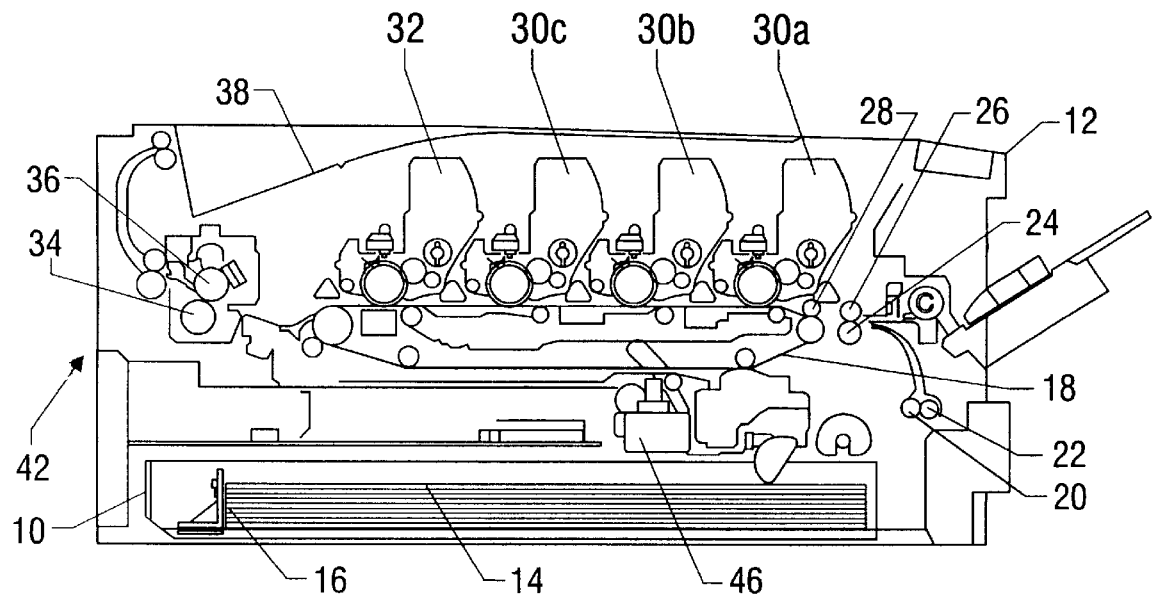
FIG. 1 is a cross-sectional side view of a printer of the present invention.

Referring to the drawings, and initially to FIG. 1 thereof, there is shown a tray 10 used in a printer 12 of the type known as a tandem printer, in which the printing heads can print color images in registration on a single pass of a sheet of media. The tray 10 supports a plurality of sheets 14 of media such as bond paper, for example, in a stack 16. Other media, such as envelopes and labels, may also be used in the printer 12. The sheets 14 from the tray 10 are fed to a belt 18 by a pair of rollers 20, 22, a pair of registration rollers 24, 26 and thence past an absorption roller 28 into contact with the printing heads 30a, 30b, 30c, 32. In the illustrated embodiment, the color printing heads 30a, 30b, 30c print the colors magenta, cyan, and yellow, respectively, in registration to form color images on the sheets 14. The printing head 32 prints only monochrome images on sheets 14, and is commonly referred to as the "black and white" printing head. Once the printing heads 30a–c, 32 have printed color and/or monochrome images on the sheets 14, the sheets 14 are moved by the belt 18 to a press roller 34, a fuser roller 36, and thence, to an output tray 38. The belt 18 and associated gears, motors, and rollers 20–28, 34, 36 comprise a paper feed path 40 of the printer 12 and, along with the printing heads 30a–c, 32 and associated elements, are commonly referred to as a print engine 42.

Figure 2A:
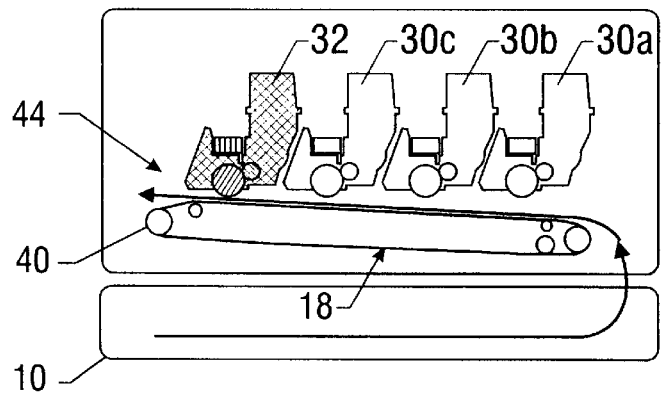
FIGS. 2A–2B are schematic side elevational diagrams of the printer of FIG. 1 showing the positions of the paper path in the color and monochrome printing positions.

FIG. 2A illustrates the paper feed path 40 of the printer 12 in a monochrome printing position 44. In the monochrome printing position 44, the sheets 14 contact only the monochrome printing head 32, and not the color printing heads 30a–c, as the upstream or right hand side (as viewed in the Figure) of the belt 18 is lowered by the action of a belt unit drive motor 46 (see FIG. 1) under control of a suitable software program, as discussed more fully below. In the monochrome printing position 44, the printer 12 can only print monochrome images on the sheets 14. It is to be noted that, as the color printing heads 30a–c do not contact the sheets 14, the color printing heads 30a–c do not experience any wear when the sheets 14 are printed.

Figure 2B:
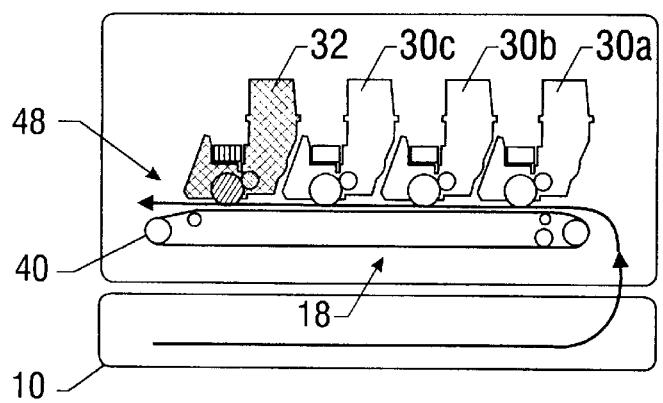

In FIG. 2B, the belt unit drive motor 46 has been activated to move the upstream or right hand side (as viewed in the Figure) of the belt 18 upwards, and the paper feed path 40 is in a color printing position 48. In the color printing position 48, the sheets 14 contact both the color printing heads 30a–c and the monochrome printing head 32. Since the sheets 14 contact both the color and monochrome printing heads 30a–c, 32, both monochrome and color images can be printed on the sheets 14 and thus, the phrase "color printing position" as used herein 48 does not mean that the printer 12 prints only in color. It is to be noted that the color printing heads 30a–c, when the paper feed path 40 is positioned in the color printing position 48, experience unnecessary wear as compared with the wear the color printing heads 30a–c would experience if the paper feed path 40 was in the monochrome printing position 44 of FIG. 2A if only monochrome images are printed, as the sheets 14 contact the color printing heads 30a–c for every monochrome sheet printed. The color printing heads 30a–c, of course, must be replaced at considerable expense and inconvenience when they wear out.

The printer 12 normally requires a much shorter time period to change the paper feed path 40 from the color printing position 48 of FIG. 2B to the monochrome printing position 44 of FIG. 2A, than vice versa. All that is required is the activation of the belt unit drive motor 46 to lower the right hand side of the belt 18. In one exemplary embodiment, the printer 12 switched the paper feed path 40 from the color printing position 48 to the monochrome printing position 44 in about eight (8) seconds.

However, considerably more time is required to change the paper feed path 40 from the monochrome printing position 44 of FIG. 2A to the color printing position 48 of FIG. 2B. In order to effect this change, the belt unit drive motor 46 is activated to move the right hand side of the paper feed path 40 and the belt 18 upwards until the belt 18 contacts the color printing heads 30a–c. The color printing heads 30a–c must then be carefully aligned by a time-consuming process so that the magenta, cyan, and yellow color images formed thereby are correctly in register on the sheets 14, and an accurate, high quality image is formed. In the aforementioned exemplary embodiment, the printer 12 required approximately ninety (90) seconds to switch the paper feed path 40 from the monochrome printing position 44 to the color printing position 48.

It will be recalled that the printer 12 can operate in the high speed printing mode, with the highest printing speed, or in the high yield mode, with a slower printing speed but longer supply use.

It will be recognized from the foregoing description that considerable delays in the printing of multiple sheets 14 result if the printer is in the high yield mode and a print job contains alternating monochrome and color sheets to be sequentially printed, and the printer 12 correspondingly changes the paper feed path 40 numerous times between the color and monochrome printing positions 48, 44, or if numerous print jobs with alternating color and monochrome sheets are printed and the printer 12 changes the paper feed path 40 numerous times between the color and monochrome printing positions 48, 44. The multiple changes of the paper feed path 40 take considerable time to perform, as do the alignments of the color printing heads 30a–c.

Figure 3:
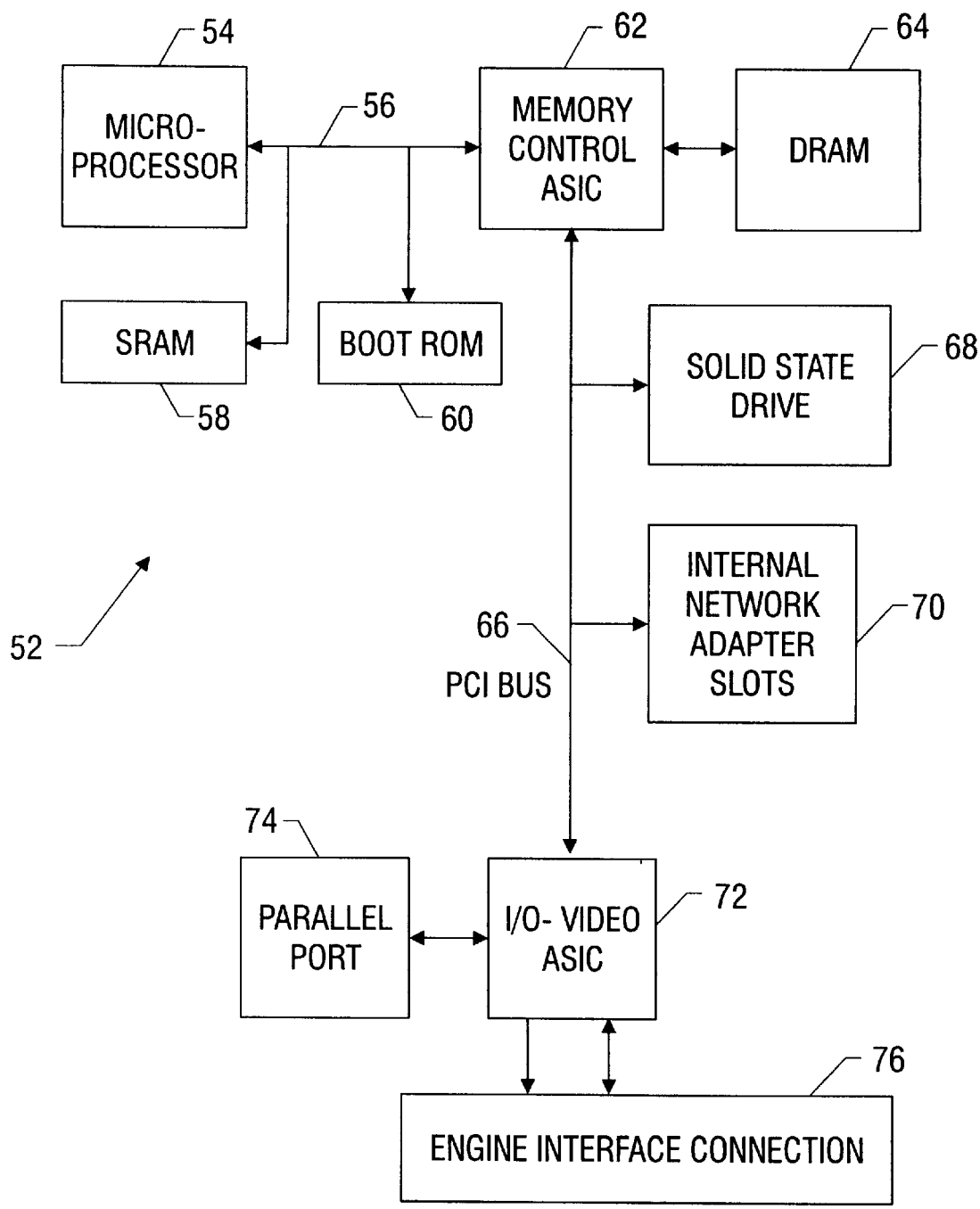
FIG. 3 is a schematic circuit diagram of a raster image processor circuit of the present invention.

Turning now to FIG. 3, a raster image processing circuit 52 of the present invention includes a microprocessor 54 coupled via a bus 56 to a Static Random Access Memory (SRAM) 58, a boot Read Only Memory (boot ROM) 60, and a memory control application specific integrated circuit (ASIC) 62. In one exemplary embodiment, the microprocessor 54 was a Vr5000 RISC-based microprocessor manufactured by MIPS Technologies, Inc. A Dynamic Random Access Memory (DRAM) 64 is coupled to the memory control ASIC 62. A Peripheral Component Interconnect (PCI) bus 66 connects the memory control ASIC 62 to a solid state drive 68, internal network adapter slots 70, and an input-output video application specific integrated circuit (I/O Video ASIC) 72. The internal network adapter slots 70 permit network adapters to be connected to the raster image processing circuit 52, and may include, for example, an Ethernet card, a token ring card, a fax port, a scanner port, a serial bus port, and a Universal Serial Bus (USB) port. These network adapters may be the source of any number of print jobs for the printer 12. Other network devices may be connected to the raster image processing circuit 52 via the internal network adapter slots 70, as will be suggested to those of skill in the art. Parallel ports 74 are connected to the I/O Video ASIC 72. The print engine 42 of the printer 12 connects to the I/O Video ASIC 72 through the engine interface connection 76.

Figure 4:
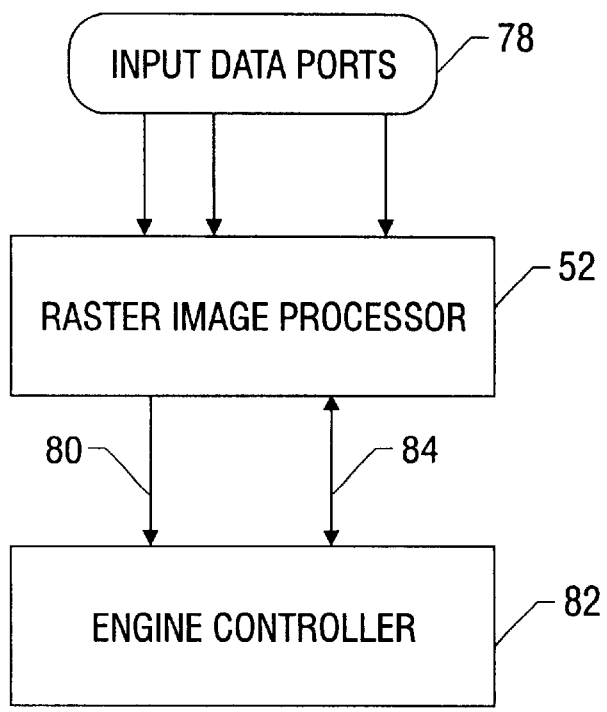
FIG. 4 is a schematic diagram of data flow in the circuit of FIG. 3.

Referring to FIG. 4, the raster image processing circuit 52 receives data from input data ports 78. This data may come from a network via the cards installed in the network adapter slots 70 (see FIG. 3). The data from the input data ports 78 generally represent page data or images to be printed for the print jobs and related data. The raster image processing circuit 52 and associated software, as discussed in connection with FIGS. 5–8, analyze the page data, the default settings of the printer 12, and related data to select the appropriate color or monochrome printing position 48, 44 of the paper feed path 40 for the printer 12 and then send signals over a command interface bus 80 to a print engine controller 82 coupled to the print engine 42. Once the raster image processing circuit 52 has configured the printer 12 and the print process has begun, the raster image processing circuit 52 sends the bitmap data over a video interface bus 84 to the engine controller 82 for printing on the sheets 14 with the color and monochrome printing heads 30a–c, 32, as discussed in connection with FIGS. 1 and 2.

FIGS. 5–8 depict flowcharts for software that is associated with the raster image processing circuit 52, stored in the solid state drive 68, and loaded in the DRAM 64 and SRAM 58 for execution in the microprocessor 54. The associated software includes subroutines that store data on prior print jobs and switch the paper feed path 40 between the color printing position 48 and the monochrome printing position 44 in response thereto, as discussed more fully below, in the adaptive mode of the present invention.

Turning now to FIG. 5, the program flow enters at "Start" 100 with the paper feed path 40 of the printer 12 in the color printing position 48. Program flow continues at point 102, where software determines if the print job has a monochrome page to be printed. If the print job does not include a monochrome page, i.e., all the pages are color pages, then program control continues at an "End" 104.

If the print job includes a monochrome page, control continues at point 106, where the software determines whether the printer 12 is in the high yield mode. The printer 12 makes the maximum use of replaceable supplies such as toner when utilizing the high yield mode, and consequently, the printer 12 may change the paper feed path 40 from the color printing position 48 to the monochrome printing position 44 in order to do so. (By distinction, when the printer 12 is in the high speed mode, the printer 12 may not change the paper feed path 40 from the color printing position 48 to the monochrome printing position 44.) If the printer 12 is in the high yield mode, program flow continues at point 108, where the software configures the printer 12 to print a monochrome page with the paper feed path 40 in the monochrome printing position 44 by sending appropriate signals to the belt unit drive motor 46 to lower the right hand side of the belt 18 and position the paper feed path 40 in the monochrome printing position 44. Program flow then concludes at the End 104.

If the printer 12 is not in the high yield mode, program flow continues at point 110, where the software determines whether the printer 12 is in the high speed mode. When the printer 12 is in the high speed mode, the paper feed path 40 of the printer 12 remains in the color printing position 48 at all times, so that no time is spent changing the paper feed path 40 or aligning the color printing heads 30*a–c*. If the printer 12 is in the high speed mode, program flow continues at 112, where the software makes no changes to the configuration of the printer 12, i.e., the paper feed path of the printer 12 remains where it is. The monochrome print job is consequently printed with the paper feed path 40 in the color printing position 48.

Figure 6:
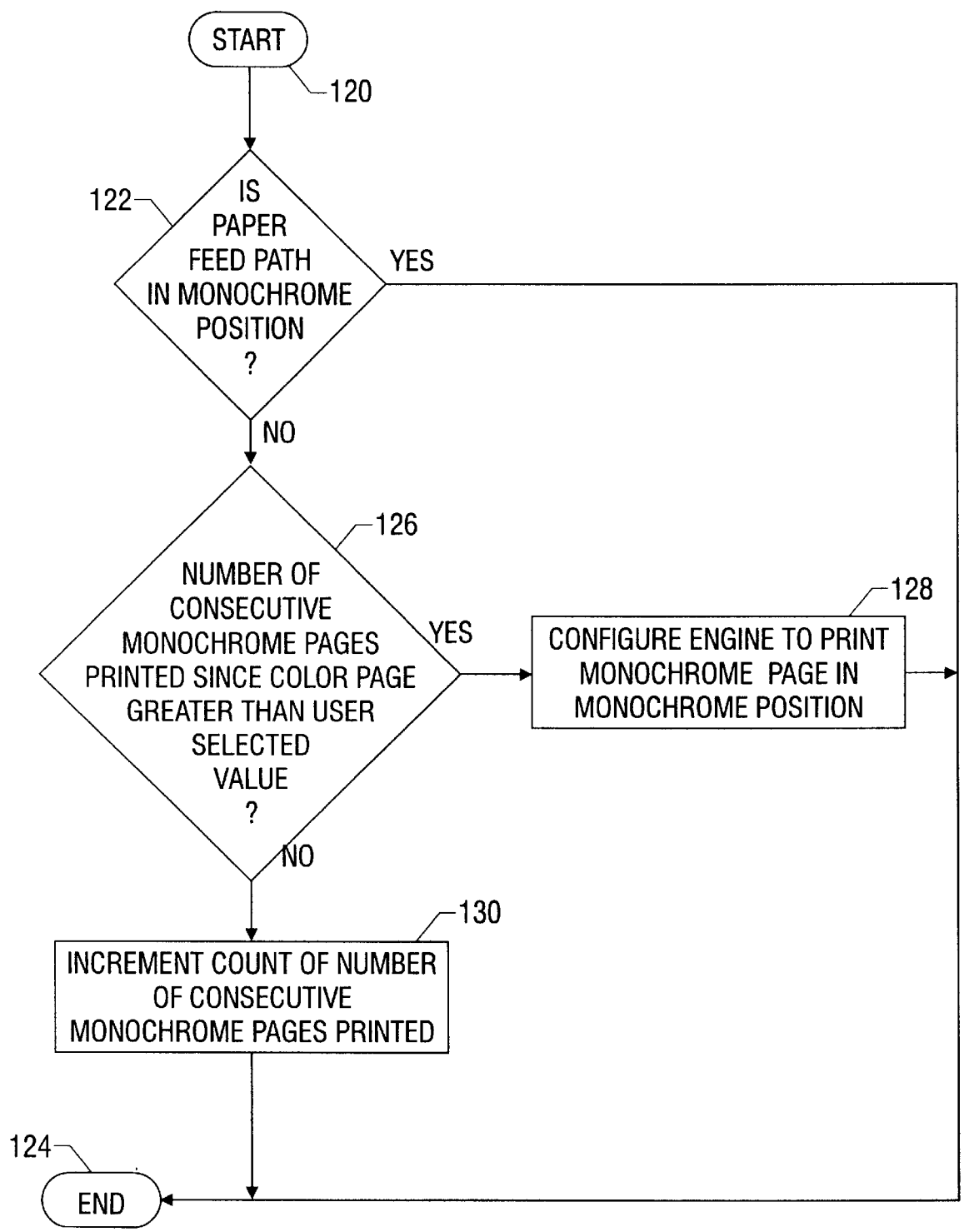
FIG. 6 is a flowchart for software that implements the customer adapt setting for the adaptive mode of the printer.
Figure 7:
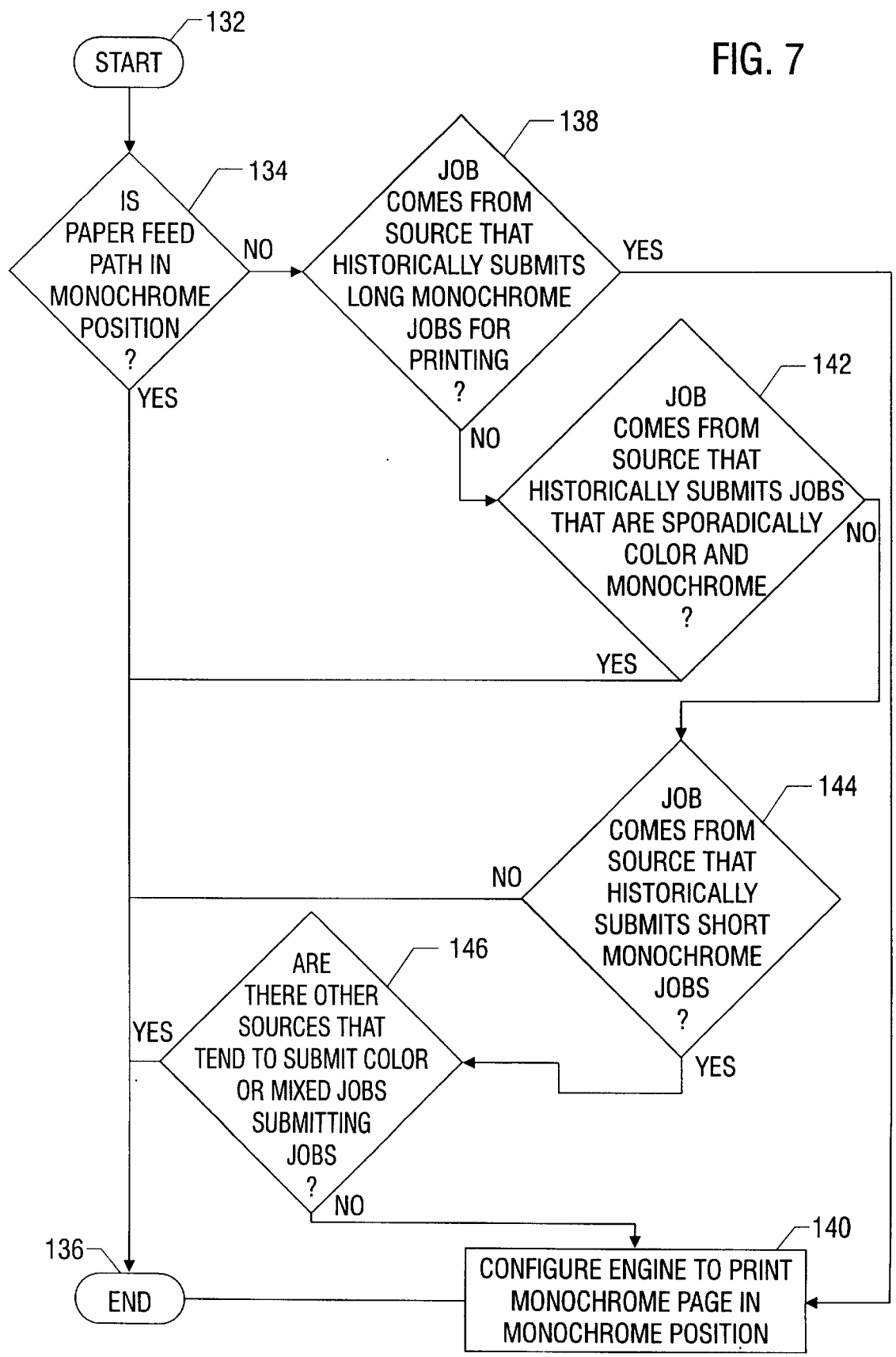
FIG. 7 is a flowchart for software that implements the automatic adaptive setting for the adaptive mode of the printer.
Figure 8:
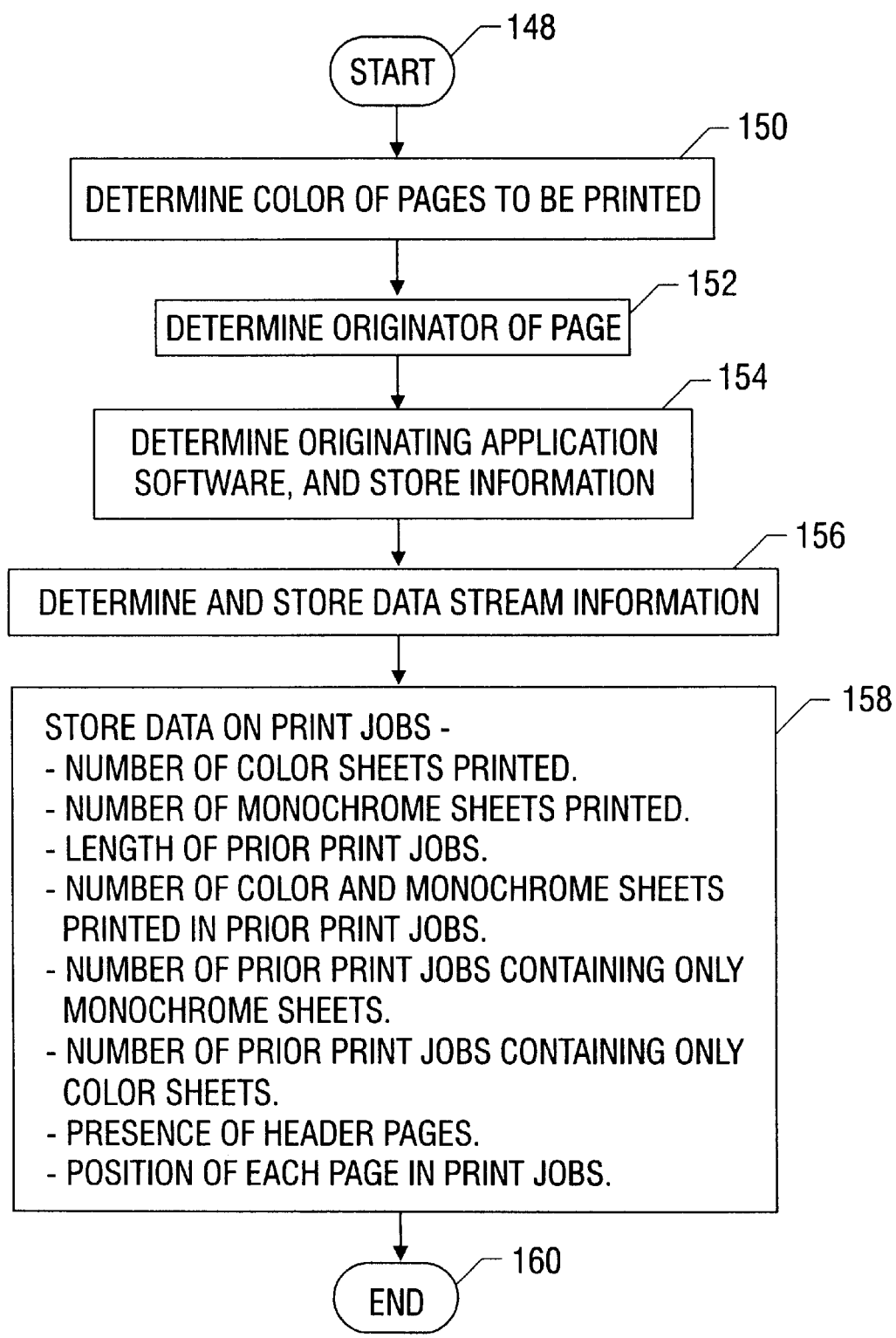
FIG. 8 is a flowchart for software that collects data used in the method of FIG. 7.

If the printer 12 is not in the high speed mode, program flow continues at point 114, where the software determines whether a user has selected the automatic adaptive setting for the adaptive mode of the printer 12, discussed more fully in connection with FIGS. 7 and 8. If the user has not selected the automatic adaptive setting for the adaptive mode of the printer 12, program flow continues at point 116, where the software determines the appropriate color or monochrome position 48, 44 of the paper feed path 40 per the customer adapt setting, as discussed more fully in connection with FIG. 6. If the user has set the printer 12 to use the automatic adaptive setting for the adaptive mode, program flow continues at point 118, where the software determines the appropriate color or monochrome position 48, 44 of the paper feed path 40.

According to the adaptive mode of the printer 12, and particularly when the automatic adaptive setting is selected, the software maintains a count of the number of consecutive monochrome pages that have been printed with the paper feed path 40 in the color position 48 since the last color page was printed, compares this count with a calculated value representing the maximum number of consecutive monochrome pages to be printed before changing the printer feed path 40 to the monochrome printing position 44, and then changes the printer feed path 40 to the monochrome printing position 44 when the values are the same. The calculated value is derived from numerous factors, as discussed more fully below, but includes data from prior print jobs printed by the printer 12. The calculated value represents the maximum number of consecutive monochrome pages to be printed with the paper feed path 40 in the color printing position 48 before changing the printer feed path 40 to the monochrome printing position 44, and is significant because, when accurately calculated and used to change the paper feed path 40 of the printer 12, minimal wear on the color heads 30*a–c* occurs while allowing a faster printing speed than when the printer 12 operates in the high yield mode. The printer 12 changes the paper feed path 40 to the monochrome printing position 44 according to the calculated value when a large number of monochrome sheets are likely to be printed.

FIG. 6 depicts a flowchart for a software program used in printer 12 when a user, and not the software program, selects a value representing the maximum number of consecutive monochrome pages to be printed with the paper feed path 40 in the color printing position 48 since the last color page was printed before the printer feed path 40 of the printer 12 is changed to the monochrome printing position 44. Program flow begins at the point marked "Start" 120 and proceeds thence to a point 122, where the software determines whether the paper feed path 40 is in the monochrome printing position 44. If the paper feed path 40 of the printer 12 is in the monochrome printing position 44, program flow continues at an "End" 124.

If the paper feed path 40 of the printer 12 is in the color printing position 48, program flow continues at point 126, where the software determines whether the number of consecutive monochrome pages printed since the last color page was printed is greater than the value selected by the user. If the number is greater than the selected number, program flow continues at point 128, where the software sends signals to change the paper feed path 40 of the printer 12 to the monochrome printing position 44. The monochrome page is then printed with the paper feed path 40 of the printer 12 in the monochrome printing position 44.

If the number is less than the selected number, program flow continues at point 130, where a count representing of the number of consecutive monochrome pages printed since the last color page was printed is incremented. The monochrome page is then printed with the paper feed position 40 of the printer 12 in the color printing position 48.

It will be appreciated that the software program illustrated in FIG. 6 permits a user to override a value calculated by the software. Such a manual override may be useful for instances when the user has specific knowledge of the composition of a pending print job, or otherwise finds the performance of the printer 12 under the control of the software to be unacceptable.

FIG. 7 depicts a flowchart for a software program used in printer 12 where a user selects the automatic adaptive setting for the adaptive mode of the present invention. The related data collected with the software program of FIG. 8 is used to calculate the predetermined number of monochrome sheets to be printed with the paper feed path 40 in the color printing position 48 before switching the paper feed path 40 of the printer 12 to the monochrome printing position 44.

Beginning from a "Start" 132, program flow continues at point 134, where the software determines the current configuration of the printer 12, i.e., whether the paper feed path 40 of the printer 12 is in the monochrome printing position 44. If the paper feed path 40 of the printer 12 is in the monochrome printing position 44, program flow continues at an "End" 136.

If the paper feed path 40 of the printer 12 is in the color printing position 44, program flow continues at point 138, where the software determines whether the print job comes from a source that has previously submitted print jobs containing a large number of monochrome pages. It will be recalled from a discussion of FIGS. 3 and 4 that the internal network adapter slots 70 permit network adapters to be connected to the raster image processing circuit 52, and may include, for example, Ethernet cards, token ring cards, fax ports, scanner ports, serial bus ports, and Universal Serial Bus (USB) ports, and these network adapters may be the source of any number of print jobs for the printer 12. If the print job comes from a source that has previously submitted print jobs containing a large number of monochrome pages, program flow continues at 140, where the software sends signals to change the paper feed path 40 of the printer 12 to the monochrome printing position 44. Program flow then terminates at the End 136.

If the print job comes from a source that has not previously submitted print jobs containing a large number of monochrome pages, program flow continues at point 142, where the software determines whether the print job comes from a source that has previously submitted print jobs that contain both color and monochrome pages. If the print job comes from a source that has previously submitted print jobs that contain both color and monochrome pages, program flow terminates at the End 136.

If the print job comes from a source that has not previously submitted print jobs that contain both color and monochrome pages, program flow continues at point 144, where the software determines whether the print job comes from a source that has previously submitted print jobs with a small number of monochrome pages. If the print job does not come from a source that has previously submitted print jobs with a small number of monochrome pages, program flow terminates at the End 136.

If the print job comes from a source that has previously submitted print jobs with a small number of monochrome pages, program flow continues at point 146, where the software determines if there are other print jobs present from other users that tend to submit print jobs with only color pages, or with print jobs containing both color and monochrome pages. If there are neither print jobs present from other users that tend to submit print jobs with only color pages, nor print jobs containing both color and monochrome pages, then program flow continues at point 140, where the software sends signals to change the paper feed path 40 of the printer 12 to the monochrome printing position 44. Program flow terminates at the End 136.

If there are other print jobs present from other users that tend to submit print jobs with only color pages, or with print jobs containing both color and monochrome pages, program flow terminates at the End 136.

A software program corresponding to the flowchart of FIG. 8 collects the historical or related data used in the software program corresponding to the flowchart of FIG. 7 and stores it in the solid state drive 68. Beginning at "Start" 150, program flow continues at point 152, where the software determines the composition, i.e., the mix of color and monochrome sheets, of the print jobs submitted to the raster image processing circuit 52 from the data input ports 78, and stores the result in the solid state drive 68.

Program flow continues at point 154, where the software determines the identity of the originator of the print job, and stores the result in the solid state drive 68. The information may be the originating data port, the originating printer port, or the network address of the originating computer if the print job comes from a network via a network adapter card inserted in one of the network adapter slots 70.

Program flow continues at point 156, where the software identifies the type of the originating application software, for example, whether the print job comes from a word processing program, and stores the result in the solid state drive 68.

Program flow continues at point 158, where the software identifies the composition of the datastream, and stores the result in the solid state drive 68. This information may be, for example, the language of the print job, such as the PCL®XL language or the PostScript® language. A print job in the PCL®XL language, for example, is a datastream that contains no color extensions, so any print job in this language will not contain any color sheets. The software uses this information in determining the appropriate position of the paper feed path 40 in which to print a job with the printer 12.

Program flow continues at point 160, where the software stores in the solid state drive 68 data on the color and monochrome pages in the print job, and data on the position of the pages within the print jobs. This information permits a search for patterns in the print jobs, such as the presence of monochrome header pages or the like. Other stored information can include the number of color sheets printed in prior print jobs, the number of monochrome sheets printed in prior print jobs, the length of prior print jobs, the number of color and monochrome sheets printed in each of the prior print jobs, the number of prior print jobs containing only monochrome sheets, and the number of prior print jobs containing only color sheets. Program flow then terminates at an "End" 162.

Figure 9:
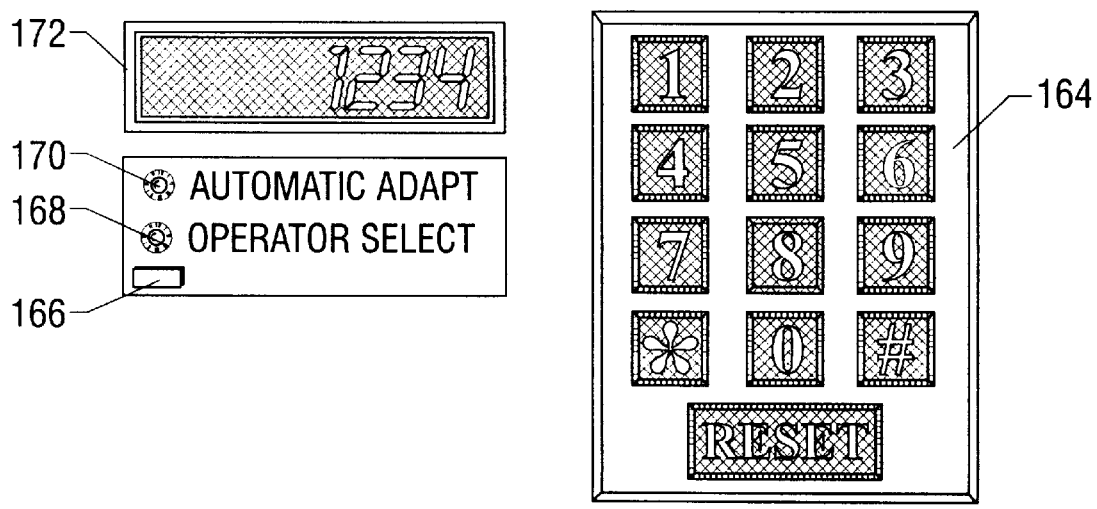
FIG. 9 illustrates a user input device of the present invention.

A keypad or touchpad 164 (see FIG. 9) is located on a top or side panel (not shown) of the printer 12 and, when coupled to the software run in the raster image processor 52, allows manual input by a user. For example, a user may utilize the keypad 164 to set a value representing the maximum number of consecutive monochrome pages to be printed since the last color sheet was printed before changing the paper feed path 40 of the printer 12 to the monochrome position to print monochrome images. A user first presses a button 166 to select the operational setting of the printer 12 in the adaptive mode, i.e., either the automatic adaptive setting or the customer adapt setting, and correspondingly illuminate a light emitting diode (LED) 168, 170, respectively. The user then inputs with the keypad 164 the number of consecutive monochrome pages to be printed since the last color page was printed with the paper feed path 40 in the color printing position 48 before switching the position of the paper feed path 40 of the printer 12 to the monochrome printing position 44. This number is displayed on a suitable display device, such as a liquid crystal display (LCD) 172.

It will be appreciated by those of ordinary skill in the art that the keypad 164, the button 166, and the light emitting diodes 168, 170 could be replaced by a series of menus displayed on the liquid crystal display (LCD) 172 and a keypad with a smaller number of keys than the number in the keypad 164.

It will thus be appreciated from the foregoing description that a printer and a method of operating the same in accord with the present invention will reliably and quickly print both color and monochrome pages while minimizing wear on the component parts. In particular, the invention will collect data from prior print jobs, such as the number of color sheets printed in prior print jobs, the number of monochrome sheets printed in prior print jobs, and the length of prior print jobs, store the resulting data in the solid state drive 68, calculate the number of sheets 14 to be printed with the paper feed path 40 in the color printing position 48 before switching to the monochrome printing position 44, and send signals to the belt unit drive motor 46 to switch the position of the paper feed path 40 between the positions in order to minimize wear on the color printing heads 30*a–c* and delays in switching the paper feed path 40. Optionally, a user may override the automatic adaptive setting of the printer 12 and preset the number of monochrome pages to be printed before the paper feed path 40 of the printer 12 changes from the color printing position 48 to the monochrome printing position 44. The printer 12 thus has low maintenance costs since important and expensive components such as the color printing heads 30*a–c* do not wear out quickly, and yet the printing speed of the printer 12 is greater than that when the printer 12 operates in the high yield mode.

It will also be appreciated that the flowcharts of the several Figures may be coded in any suitable computer language, such as C++, and stored in the solid state drive 68 or other memory unit. Alternatively, the software could be stored in a server on a network and the program could communicate through a network card inserted in the network adapter slots 70. This code may take the form of any number of subroutines that perform the indicated operations.

For purposes of exemplification, particular embodiments of the invention have been shown and described according to the best present understanding thereof. However, it will be apparent that various changes and modifications in the arrangement and construction of the parts thereof may be made without departing from the spirit and scope of the invention as defined in the appended claims.

What is claimed is:

1. Printer for printing print jobs of monochrome and color images on sheets of media comprising:
    a monochrome printing head for creating a monochrome image on said sheets of media;
    a plurality of color printing heads for creating a color image on said sheets of media;
    a media feed path for moving said sheets of media by said printing heads, said media feed path having a color position wherein said color printing heads print color images on said sheets and said monochrome printing head prints monochrome images on said sheets, and a monochrome position wherein said monochrome printing head prints monochrome images on said sheets but said color printing heads cannot print color images on said sheets;
    a memory for storing data on the frequency of monochrome and color images in previous of said print jobs; and
    a control circuit responsive to said data stored in said memory for switching said media feed path from said color position to said monochrome position to print monochrome images on said sheets, said control circuit including means for setting a predetermined number of monochrome sheets to be printed with said media feed path in said color printing position before switching said media feed path to said monochrome printing position to print monochrome images on said sheets.

2. The printer of claim 1; wherein said means for setting includes input means to allow an operator to select a desired maximum number of monochrome sheets to be printed with said media feed path in said color printing position before switching said media feed path to said monochrome printing position to print said monochrome images on said sheets.

3. The printer of claim 1; wherein said control circuit includes means for adaptively determining said predetermined number of monochrome sheets to be printed with said media feed path in said color printing position before switching said media feed path to said monochrome printing position to print said monochrome images on said sheets.

4. The printer of claim 3; wherein said means for adaptively determining calculates said predetermined number from said data stored in said memory.

5. The printer of claim 4; and further comprising means for storing data from the users of said print jobs in said memory.

6. The printer of claim 4; and further comprising means for storing in said memory data from the type of applications of said print jobs.

7. The printer of claim 4; and further comprising means for storing in said memory data from the printer ports of said print jobs.

8. The printer of claim 4; and further comprising means for storing in said memory data on the number of color sheets printed in said print jobs.

9. The printer of claim 4; and further comprising means for storing in said memory data on the number of monochrome sheets printed in said print jobs.

10. The printer of claim 4; and further comprising means for storing in said memory data on the length of said print jobs.

11. The printer of claim 4; and further comprising means for storing in said memory data on the number of color and monochrome sheets printed in each of said print jobs.

12. The printer of claim 4; and further comprising means for storing in said memory data on the number of said print jobs containing only monochrome sheets.

13. The printer of claim 12; and further comprising means for storing in said memory data on the number of said print jobs containing only color sheets.

14. The printer of claim 4; wherein said control circuit includes:
    a microprocessor;
    a second memory; and
    a computer program stored in said second memory.

15. The printer of claim 5; and further comprising a motor coupled to said control circuit for moving said media feed path from said color position to said monochrome position.

16. In a printer having a monochrome printing head for creating a monochrome image from a print job on sheets of media, a plurality of color printing heads for creating a color image from a print job on said sheets of media, and a media feed path for moving said sheets of media by said printing heads, said media feed path having a color position wherein said color printing heads print color images on said sheets and said monochrome printing head prints monochrome images on said sheets of media, and a monochrome position wherein said monochrome printing heads prints monochrome images on said sheets but said color printing heads cannot print color images on said sheets, wherein the improvement comprises means for storing the number of monochrome images printed consecutively, and means responsive to said stored number equaling a predetermined number for switching said media feed path from said color position to said monochrome position to print monochrome images on said sheets.

* * * * *